Figure 8:
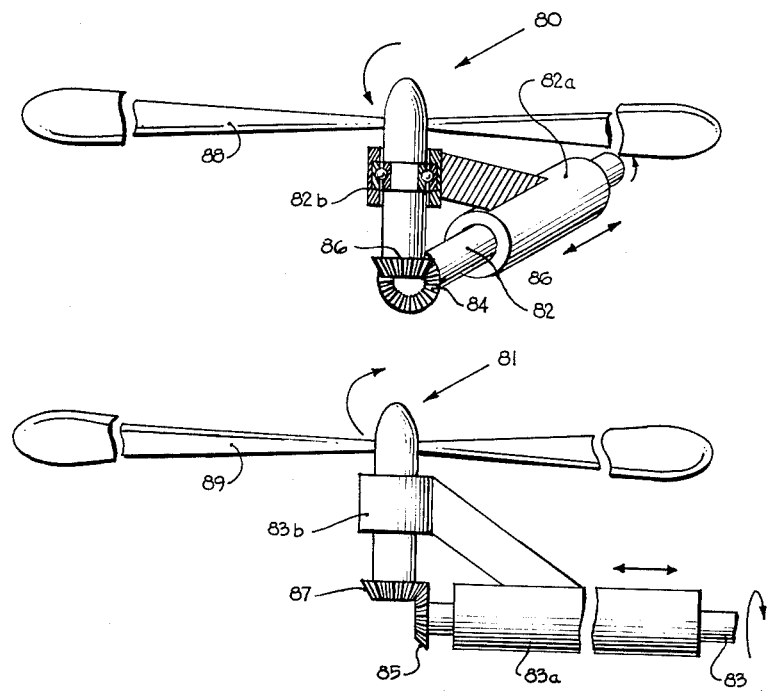

July 5, 1966  C. REED  3,259,339
VEHICLE PROPULSION DIRECTIONAL CONTROL
Filed Aug. 27, 1963  2 Sheets-Sheet 1
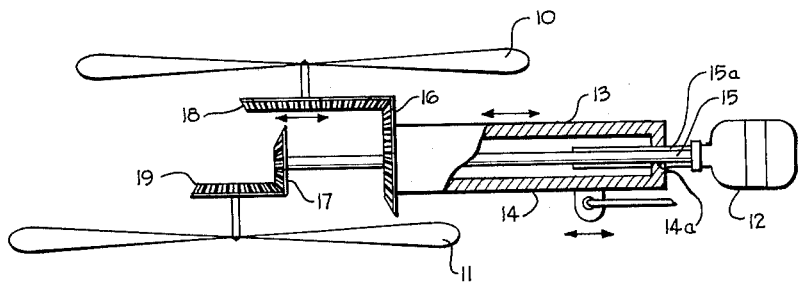
FIG. 1
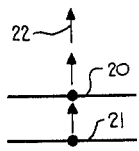   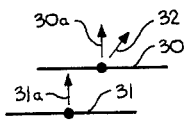   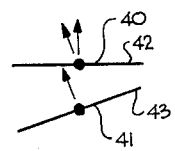
FIG. 2   FIG. 3   FIG. 4
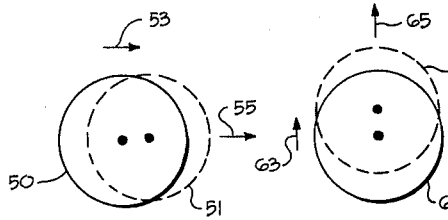
FIG. 5   FIG. 6   FIG. 7
INVENTOR.
CLARENCE REED
BY Sheldon H Parker
ATTORNEY United States Patent Office 3,259,339
Patented July 5, 1966

3,259,339
VEHICLE PROPULSION DIRECTIONAL CONTROL
Clarence Reed, 2888 Grand Concourse, Bronx 58, N.Y.
Filed Aug. 27, 1963, Ser. No. 304,994
6 Claims. (Cl. 244—17.19)

This invention relates to the propulsion of vehicles, and more particularly, to an apparatus for providing directional stability and variability in vehicles and particularly in airborne vehicles.

The changing of the flight direction of aircraft usually requires complex equipment and produces large power losses particularly because of the resultant turbulent airflow.

It is desirable, however, that flight control equipment be simple to operate in order to facilitate operation by unskilled personnel, and that the power consumption be as low as possible.

It is also of great importance that aircraft be capable of a substantial degree of restricted descent in the event of a power failure. Thus, while conventional winged aircraft are usually capable of "gliding" during free-fall, aircraft, such as helicopters, normally exhibit an insufficient "gliding" action.

Directional control during free-fall is another factor of critical significance because of the obvious desirability of being able to select a place to land.

Low cost, non-complex aircraft, capable of taking off and landing in small areas, have numerous diverse possible applications In addition to the obvious military applications of such aircraft, the problem of commutation between suburban areas and the "big cities" present an area in which such aircraft would be highly desirable.

In spite of the obvious desirability of vertical take-off and landing aircraft, their complexity, lack of safety, and relatively high cost, have limited their commercial acceptability.

It has now been found that rapid and accurate directional control of vehicles can be provided by simple— and consequently easy to operate—low cost equipment.

According to the present invention, a directional control system is provided, which can be used in vehicles, such as aircraft and water-craft, and includes a pair of axially alignable propelling units which are positioned in a series relationship with respect to their primary direction of motion. The units are axially aligned in order to provide a co-axial unidirectional thrust.

Means are provided for axially offsetting at least one of the propelling units, preferably while maintaining a parallel relationship between the planes of operation of the propelling units. The offset units, in combination, produce a resultant propelling force, which is angularly offset from the primary direction of propulsion of each unit acting individually.

The invention will be better understood from the following specifications, wherein the invention is described by reference to the embodiments illustrated by the accompanying drawings wherein:

FIGURE 1 is a side elevational view, partly in section, of a pair of laterally displaceable propellers, FIGURES 2, 3 and 4 are schematic representations of side views of pairs of propellers in axially aligned and non-aligned positions, FIGURES 5, 6 and 7 are schematic representations of plan views of pairs of propellers in various non-aligned positions, and FIGURE 8 is a fragmentary perspective view, partly in section, of a pair of axially displaceable propellers.

As shown in FIGURE 1, a pair of propellers 10 and 11 are driven by a single power source 12. A slideable gear linkage 13, provides for the independent lateral movement of propeller 10, by means of elements 14, 16, and 18.

The power source 12, turns shaft 15, which in turn, turns the tubular-geared member 14. A drive connection between members 14 and 15 is provided by means of gear teeth 14a, on the tubular member 14, which cooperate with the gear teeth 15a, which extend over a portion of the length of shaft 15.

The gear drive connection may be provided at either end, or both ends of the tubular member 14, and gear teeth 15a, can extend the full length of shaft 15; or if so desired, can have a length just sufficient to permit a drive connection between members 14 and 15 over a portion of shaft 15.

The rotating tubular gear member 14 is interconnected with the propeller 10, by means of the tapered gears 16 on the tubular member, and the tapered gears 18 on the propeller member. The propeller is linked to the tubular gear member 14, and supported for lateral movement by means not shown. Thus, the shifting of tubular member 14, to the left, causes a corresponding shifting of the position of the propeller 10.

Similarly, propeller 11 may be laterally displaced, while the tubular member 14 is held firm, by laterally moving the power unit 12, the drive shaft 15, and the propeller 11.

As shown in FIGURE 2, the propellers 20 and 21 are co-axially positioned, and the driving force of one unit cooperates with the driving force of the other unit in the manner normally employed in helicopters, in order to produce a combined unidirectional driving force.

The propeller 30, as shown in FIGURE 3, is displaced to the right, with respect to the propeller 31. The arrows 30a and 31a show the primary propulsion forces of the propellers 30 and 31, to be at right angles to the planes of rotation of the propellers. However, as shown by arrow 32, the resultant propulsion force produced by propellers 30 and 31, is at an angle to the primary force.

Any turning moment which exists must be attributed to the lower propeller causing the change in the direction of motion because the upper propeller will be caused to rotate about the center of rotation of the lower propeller.

The direction of flight of aircraft powered by a pair of axially displaceable rotors will be determined by the degree to which the rotors are offset, as well as the direction in which they are offset.

As noted in FIGURE 4, an offset relationship between two propellers can be achieved by tilting at least one of the propellers 41. When tilting only one member of a pair of propellers, the maximum amount of tilt, or angular offset, is controlled by the minimum possible operating clearance which must be maintained between the blades of the two propellers, since, as shown in FIGURE 4, an edge 43, of propeller 41, approaches the portion 42 of propeller 40.

The tilting of one rotor with respect to the other can be achieved, as for example, by mounting at least one of the rotors on a single hinged shaft. The hinge, or universal connection would then enable the axial shifting or displacing of one rotor with respect to the other, by means of a simple tilting operation. U.S. Patent 1,019,635 is noted to disclose a hinged shaft.

The solid circle 50, as shown in FIGURE 5, represents a first rotor unit, and the dashed circle 51, represents a second rotor unit. Considering rotor 50 to be stationary, the lateral displacement of rotor 51, as indicated by the arrow 53, yields a direction of force as indicated by the arrow 55.

Correspondingly, the lateral displacement of rotor 61, in the direction indicated by the arrow 63, will result in rotors 60 and 61, in combination, exerting a force in the direction indicated by the arrow 65.

As shown in FIGURE 7, it is possible to provide 360° of variability with a pair of rotors, even though each of the rotors is capable of movement along only one line or direction. By moving the rotor 70, in the direction of arrow 72, from an axially aligned position, and by moving rotor 71, in the direction of the arrow 73, from the aligned position, a resultant direction of flight can be obtained which is in the direction of arrow 75.

FIGURE 8 shows a pair of counter-rotating propeller units 80 and 81 which are independently powered and individually movable. Each unit can move in a direction which is at a right angle to the other unit and thus, as noted in regard to FIGURE 7, 360° of maneuverability can be obtained.

The units 80 and 81 are powered by motors, not shown, which drive the power shafts 82 and 83. The beveled gears 84 and 85 cooperate with the beveled gears 86 and 87 in order to rotate the propellers 88 and 89. The rotation of the propellers 88 and 89 about the drive shafts 82 and 83, is precluded through the use of fixed housings 82a and 83a, about the shafts 82 and 83. The propeller shafts are carried by housings 82b and 83b, which are rigidly secured to the housings 82a and 82b. Each of the housings 82a, 82b, 83a and 83b are provided with suitable means, such as conventional bearings, in order to provide for the free rotation of the shafts within their respective housings.

While the use of an assemblage, as shown in FIGURE 8 provides 360° of control, the use of two pairs of propeller units of the type as shown in FIGURE 1, can also provide 360° of maneuverability by positioning the gear linkage assembly of one pair of propellers, at a right angle to the gear linkage assembly of the other pair of propellers.

The fact that a moment of rotation must have a horizontal as well as a vertical force is evident from the nature of a rotational force. It is thus seen that the moment of rotation of the lower propeller in the system must bring about the rotation of the overall system.

Because of the extreme applicability of the present invention to wingless, tail-less aircraft, turning of the aircraft about its vertical central axis, or "yawing," is one type of operation which the control system of the present invention must provide.

The counter-rotating propellers or rotors can be employed to provide yaw control by simply increasing or decreasing the torque of either one of the counter-rotating members. The resultant difference in torque produces a rotation about the axis of rotation of the propellers, and thus provides the necessary control.

Although the theory of operation is not intended to constitute a limiting aspect of the present invention, it should serve to enhance the understanding of the invention and will, therefore, be discussed.

The first rotor 20, of a pair of rotors, as indicated in FIGURE 2, in the case of an airborne vehicle, will produce a flow of air towards the second rotor 21. The combined effects of the two rotors will produce a driving force in the direction indicated by the arrow 22. Axially offsetting one rotor with respect to the other, as noted in FIGURE 3, will produce unequal pressures across the length of the rotors. The right hand extremity of rotor 31 will be operating in an environment produced by the rotor 30, whereas the left hand extremity of the rotor 31 will be outside of the basic zone of airflow from rotor 30. The rotor 41, on the other hand, will continuously remain within the zone of operation of rotor 40, but the right hand extremity 43, is in closer proximity to the right hand extremity 42 of the rotor 40, than the left hand extremity of rotor 41 is to the left hand extremity of rotor 40. The speed of airflow and air pressure varies with the distance from the rotor, and therefore, the right and left hand portions of rotor 41 will not be functioning in the same environment.

The resultant variable pressure imbalances produce torque effects which serve to provide control over the direction of push or pull exerted by the rotors.

It is noted, that because of the manner in which one rotor operates upon the airflow from the other rotor, in some applications it may be desirable to employ different blades and/or independent variable pitch blades for the two rotors or propellers.

It should also be noted, that while mechanical, or powered control over the flight of a vehicle is preferable because of the possibility of automatic and accurate control, some control is obtainable through the mere movement of the operator of the vehicle. Although in a large, multi-engined and/or multi-passenger aircraft the weight of the operator may be insignificant, the movement of an operator will be critical in small single passenger aircraft such as disclosed by Robertson et al., in U.S. Patent 2,953,321. The control of the aircraft by body movements or balance is noted to be fully discussed in the Robertson et al. patent.

Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. In a propelled vehicle, a direction control system comprising at least a pair of axially alignable propelling units, the pair of units being in series with respect to the principal direction of motion, and means for axially offsetting at least one of said propelling units, while simultaneously maintaining substantially parallel orientation of said pair of propelling units, whereby the pair of offset units, in combination, produce a resultant propelling force which is angularly offset from the primary direction of propulsion of each unit acting individually.

2. For use in a propelled vehicle, a direction control system, comprising at least a pair of rotor-type of propelling members, each unit in a pair rotating in the opposite direction from the other unit, the two members of each pair being axially aligned and having parallel planes of operation, and means for axially offsetting the alignment of the two members of a pair of units, while maintaining the planes of operation, substantially constant, whereby a resultant vector force is produced, which has an angular relationship to the primary directions of force of each unit.

3. The vehicle of claim 2, wherein at least one propelling unit is a multi-bladed propeller.

4. The vehicle of claim 3, wherein at least one propelling unit is composed of a series of annularly mounted blades.

5. In a propelled vehicle, a direction control system comprising at least a pair of axially aligned propelling units, the pair of units being in series with respect to the principal direction of motion, and means for offsetting at least one of said propelling units, by offsetting the parallel orientation of said pair of propelling units, whereby the pair of offset units, in combination, produce a resultant propelling force which is angularly offset from the primary direction of propulsion of each unit acting individually.

6. For use in a propelled vehicle, a direction control system, comprising at least a pair of rotor-type of propelling members, each unit in a pair rotating in the opposite direction from the other unit, the two members of each pair being in series, axially aligned and having parallel planes of operation, and means for axially offsetting at least one of said propelling members, while maintaining the parallel alignment of the two members of a pair of units, whereby a resultant vector force is produced, which has an angular relationship to the primary directions of force of each unit.

References Cited by the Examiner

UNITED STATES PATENTS

| | | | |
|---|---|---|---|
| 1,409,850 | 3/1922 | Haney | 170—135.24 X |
| 1,806,648 | 5/1931 | Salisbury et al. | 244—66 |
| 2,806,662 | 9/1957 | Yonkers | 170—135.24 X |
| 2,876,965 | 3/1959 | Streib | 244—12 |
| 2,981,501 | 4/1961 | Schaefer | 244—23 X |
| 3,037,721 | 6/1962 | Stefanutti | 244—66 X |

FOREIGN PATENTS 621,120   4/1949   Great Britain.

MILTON BUCHLER, *Primary Examiner.*

FERGUS S. MIDDLETON, *Examiner.*

R. G. BESHA, *Assistant Examiner.*